Jan. 4, 1938. P. GLOUTON 2,104,194
MICROMETER GAUGE
Filed Aug. 20, 1934
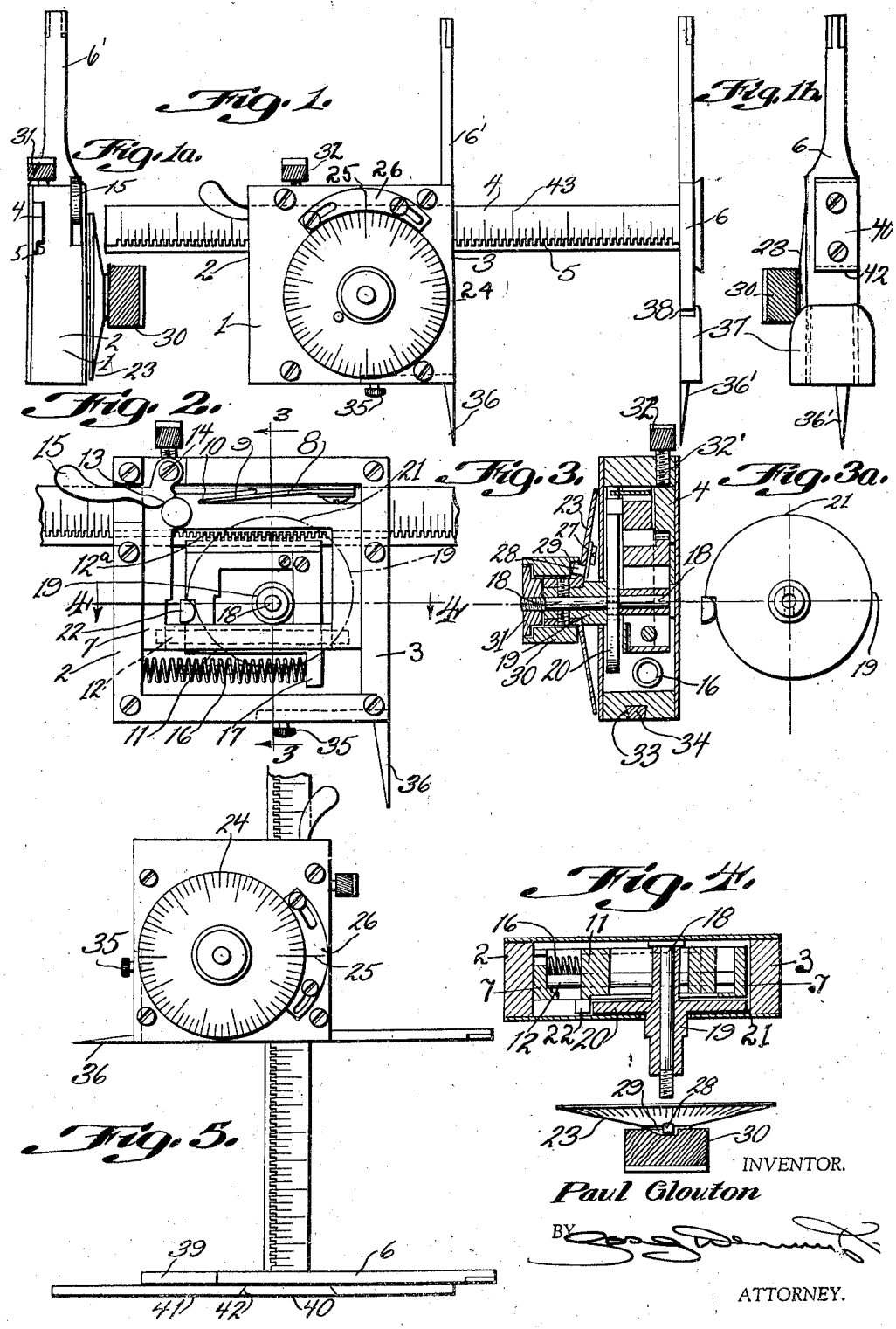
INVENTOR.
Paul Glouton
BY
ATTORNEY.

Patented Jan. 4, 1938

2,104,194

UNITED STATES PATENT OFFICE 2,104,194

MICROMETER GAUGE

Paul Glouton, Philadelphia, Pa.

Application August 20, 1934, Serial No. 740,549

9 Claims. (Cl. 33—147)

My invention is an improved gauge in which a caliper may be quickly shifted over considerable distances to effect and clearly indicate an approximate measurement and the caliper then may be rapidly and accurately shifted micrometrically to effect and clearly indicate an exact measurement, without back lash or lost motion such as results from the use of geared connections in transmitting movement to a caliper.

In accordance with my invention, the micrometric movement of the caliper is effected by means of a cam which preferably has a spiral track and is rotatable to impart movement to the caliper through a toothed member permitting ready dissociation of the cam and caliper and the independent movement of the latter in making rough measurements. Preferably, the toothed member is normally biased counter to the movement imparted thereto by the cam and is biased toward engaging relation with the caliper carrier.

In a preferred embodiment of my invention, a rotatable cam disk has a spiral periphery operatively connected with a slide which is provided with teeth forming a rack, the slide being normally spring biased against movement thereof by the cam. The slide is mounted on a member forming a slideway movable normal to the direction of movement of the slide. The slideway-forming member is biased by a spring to move the teeth on the slide into engagement with rack teeth on a bar or slide carrying a caliper or gauge member complementary to a caliper or gauge member having a fixed relation to the axis of the cam. The rack teeth of the slide and caliper-bar are separable from one another by a push rod or the like, to permit movement of the caliper bar independently of the cam, and the cam has a curvature or throw moving the slides a distance at least equal to the movement of the caliper bar resulting from moving it when disengaged a distance of one tooth along the cam-operable slide.

The cam is preferably operated by a shaft having fixed thereto a disk calibrated for coaction with a datum. The disk may be provided with a spring-attached detent, which is engaged to rotate the disk by a notched sleeve or grip loosely journaled on the hub of the disk and permitting slippage of the grip relatively to the cam when the calipers firmly engage an object being measured.

The characteristic features and advantages of my invention will further appear from the following description and the accompanying drawing in illustration of a preferred embodiment of my improved micrometer gauge.

In the drawing, Fig. 1 is a front elevation of a micrometer gauge embodying my improvements; Fig. 1a is an end view looking from the left side of Fig. 1; Fig. 1b is an end view looking from the right hand side of Fig. 1; Fig. 2 is a front elevation of the actuating mechanism with the housing-cover and other parts removed and the cam shown in dot and dash lines for the sake of clearness; Fig. 3 is a vertical sectional view taken on the line 3—3 of Fig. 2; Fig. 3a is a detached view of the cam and a cooperating slide stud; Fig. 4 is a horizontal part sectional view taken on the line 4—4 of Fig. 2 and with the calibrated disk and grip in exploded relation to the cam hub; and Fig. 5 is a front elevation of the device equipped and positioned as a height gauge.

As illustrated in the drawing, a housing 1 has its side walls 2 and 3 slotted to form a slideway for a caliper bar 4 provided with rack teeth 5 and a caliper 6.

A frame or carriage 7 is slidable between the walls 2 and 3 of the housing and is normally biased upward toward the top wall thereof by a leaf spring 8 having its end 9 engaged in a slot 10 in the frame 7. A slide 11 is slidably mounted on the slide bar 12 of the frame 7 and is provided with teeth 12a meshing with the teeth 5 of the bar 4 when the carriage 7 is biased toward its upper position by the spring 8. The teeth 12a may be disengaged from the teeth 5 by depressing the carriage 7 by means of a push rod or cam lever 13 pivoted on the screw 14 and having a thumb piece 15 projecting from the housing. The slide 11 is normally biased toward the right (Fig. 2) by a coiled spring 16 interposed between the wall 2 and the depending lug 17 on the slide 11.

A threaded pin 18 has its head fixed to the back of the casing 1 and has sleeved thereon the hub 19 of a disk 20 having a cam track formed by its spiral peripheral edge 21 adapted to engage the boss 22 on the slide 11 and move the latter toward the left (Fig. 2) against the biasing action of the spring 16. The radii of the curve of the periphery 21 increase constantly by uniform increments and the maximum difference between the radii at the top and bottom of the step of the cam is preferably equal to or in excess of the movement caused by shifting the rod 4 relatively to the slide 11 a distance of one tooth.

The cam hub 19 passes through the face plate of the housing 1 and has fixed thereto the hub of a conical disk 23 having a calibrated periphery 24 adapted to cooperate with the datum line 25 on an adjustable datum plate 26 fixed to the face plate of the casing. The disk 23 has fixed thereto a leaf spring 27 to which is fixed a pin or detent 28 projecting through an aperture in the disk 23 and normally seated in a notch 29 of a grip 30 loosely sleeved on the hub of the disk 23 and held in place by a nut 31 threaded on the stem 18. By the above described arrangement of spring detent between the graduated disk 23 and the grip 30, I am enabled to assemble the disk and fix it on the hub 19 in proper relation to the datum mark 25 with a minimum of time and effort, it being necessary only to graduate the disk 23 and to cut the notch 29 in the grip 30 quite independently of one another and then to assemble the two parts in the position shown by placing the disk 23 on the hub 19 and fixing it thereon with its zero mark coinciding with the datum mark 25 by means of screws and then to push the grip 30 against the detent pin 28 and turn the grip until the pin slips into the notch 29. The nut 31 is then set up on the pin 18 to hold the grip 30 in such position that the pin 28 cannot slip out of the notch 29.

A screw head 32 has a threaded shank 32' adapted to be threaded through the top wall of the housing into engagement with the bar 4 to prevent the movement of the latter when desired.

The housing 1 has fixed thereto a caliper bar or jaw 6' for cooperation with the caliper 6 on the bar 4. The housing is also provided with an undercut slide-way 33 for the attachment thereto of a slide 34, which may be fixed in position by a thumb screw 35, and is provided with a caliper point 36 adapted to cooperate with a caliper point 36' attached to a detachable slide 37 containing an undercut groove by which the member 37 may be engaged to a projection 39 of the caliper 6 of dove-tailed cross-section. It will be understood that when using caliper elements 6, 6' or 36', 36, after the rough setting of caliper elements has been made by the slide bar 4 relative to the housing 1, slide 11 is fixed on bar 4 by engaging its teeth 12ª with teeth 5 and a caliper element is held against an outer edge of the piece to be calipered, the other caliper element of the pair in use being then a short distance from the other outside edge of such piece. The other caliper element of the pair in use is then moved by the cam 21 to bring it against the piece being measured.

The caliper 6 may also have fixed thereto a dove-tailed plate 40 for the engagement of a base plate 41 having an undercut slot 42, when it is desired to use the instrument as a height gauge as illustrated in Fig. 5.

It will be understood that the screw 32' is normally disengaged from the rod 4, and that the latter, and the caliper 6, may be adjusted to an approximate measurement by depressing the finger piece 15 and therethrough the carriage 7 to disengage the teeth 12ª from the teeth 5. The approximate thickness of an object between the caliper 6 and 6' or the distance encompassed within the points 36 and 36' may be indicated by the calibrations 43 complementary to the teeth 5. The teeth 12ª are then permitted to mesh with the teeth 5 in the position thereof which is most nearly compatible with but slightly exceeds the distance being measured, the cam being so positioned that its peripheral surface of shortest radii engages the boss 22. The cam is then rotated, through the grip 30 and intermediate parts, to move the caliper 6 toward the caliper 6' until the calipers or caliper points are in position to exactly measure the desired thickness or width. Continued pressure on the grip 30 will cause the spring 27 and detent 28 to recede and permit the grip 30 to rotate freely. The movement of the cam on its axis is indicated by the movement of the disk 23 and the position of its graduations 24 relative to the datum 25 and will indicate with great accuracy the distance between the calipers or caliper points.

By suitably spacing the teeth and the graduations 24 on the disk 23, any desired system of measurement may be used. For instance, the teeth may be so spaced that the relative movement of the racks 5 and 12 a distance of one tooth effects a movement of the calipers a certain fraction of an inch, for instance, one-sixteenth. The curvature of the cam may then be made such that a complete rotation thereof on its axis effects the relative movement between housing 1 and the slide 11 an equal distance, say one-sixteenth of an inch, but for simplicity in graduating the disk 23 to indicate thousandths of an inch the curvature of the cam is preferably such that a one-sixteenth inch movement of the slide 11 is effected by slightly less than a full rotation of the cam. The scale is then divided into an appropriate number of subdivisions so that the movement of the disk a distance of one space past the datum mark 26 indicates a relative movement of the calipers of one-thousandth of an inch.

Similarly, the teeth may be so spaced that the movement of the caliper 6 caused by the shifting of the racks 5 and 12 a distance of one tooth will be equal to one millimeter and the scale on the disk may be graduated to indicate movements of one-hundredth of a millimeter for each space on the disk moved past the datum mark.

Having described my invention, I claim:

1. In a micrometer gauge, the combination of a member providing a slideway and having a caliper element connected therewith, a slide movable along said slideway and having a second caliper element connected therewith, a cam for exerting pressure against said slide to produce relative movement between the cam and slide and vary the distance between said elements, and means including a toothed member for detachably connecting said second caliper element and slide.

2. In a micrometer gauge, the combination of a member having a caliper element connected therewith, a second caliper element supported by said member and having a toothed member connected therewith, a toothed member adapted for engagement with the toothed member first named, and a cam for exerting pressure against said second named toothed member to move said caliper elements relatively to one another.

3. In a micrometer gauge, the combination of a member providing a slideway and having a caliper element connected therewith; a rectilineally movable bar having a caliper element connected therewith, a slide movable along said slideway and detachably connected with said bar, means for biasing said slide in one direction, and means including a spiral cam for exerting pressure against said slide counter to the direction toward which it is biased to vary the distance between said caliper elements.

4. In a micrometer gauge, the combination of a member providing a slideway and having a caliper element connected therewith; a toothed bar movable rectilineally, a caliper element movable with said bar, a toothed slide slidable along said slideway and detachably connected with said bar, means biasing together the teeth of said slide and bar, means for separating the teeth of said slide and bar, and micrometric means for exerting pressure on said slide to vary the distance between said caliper elements.

5. In a micrometer gauge, a housing, a slide movable on and relatively to said housing and provided with teeth, a slide within said housing capable of limited movement with respect thereto and provided with teeth adapted to mesh with the teeth of said first named slide to connect said slides in predetermined relative positions, and a cam fixed with relation to said housing for exerting pressure on said second named slide, said cam having a throw bearing a direct functional relation to the distance between predetermined positions in which said slides may be connected by said teeth.

6. In a micrometer gauge, a housing, a slide movable rectilineally in said housing, a frame movable in said housing normal to the direction of movement of said slide, a second slide carried by said frame and movable in a direction parallel to the direction of movement of said first named slide, means including a tooth for connecting said first named slide and said second named slide, means for exerting pressure on said second named slide to produce relative movement between said first named slide and said housing, and means for operating said frame for disengaging said slides.

7. In a micrometer gauge, a housing, a toothed slide movable rectilineally in said housing, a frame movable in said housing normally to the direction of movement of said slide, a spring biasing said frame toward said slide, means for moving said frame against the action of said biasing spring, a second slide movably carried by said frame, means for biasing said second slide in a direction parallel with the direction of movement of said first slide, means for exerting pressure on said second slide counter to the direction in which it is biased, and means for connecting said second named slide to said first named slide.

8. In a micrometer gauge, a housing, a slide movable relatively to said housing, a caliper element connected with said slide, a base enclosed by said housing and detachably connected with said caliper element and means for micrometrically moving said housing relatively to said base.

9. In a micrometer gauge, a housing, a toothed slide movable rectilineally in said housing, a second toothed slide movably supported within said housing, and means for biasing said second slide in a direction parallel with the direction of movement of said first slide, means for biasing said second slide to engage its teeth with those of said first slide, means for moving said second slide against the action of said second biasing spring and including a cam mounted on said housing for creating relative movement between said second slide and said housing.

PAUL GLOUTON.